(12) United States Patent
Chen

(10) Patent No.: US 10,630,574 B2
(45) Date of Patent: Apr. 21, 2020

(54) LINK PROCESSING METHOD, APPARATUS, AND SYSTEM

(71) Applicant: Tencent Technology (Shenzhen) Company Limited, Shenzhen, Guangdong (CN)

(72) Inventor: Hao Chen, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 79 days.

(21) Appl. No.: 15/619,914

(22) Filed: Jun. 12, 2017

(65) Prior Publication Data
US 2017/0279706 A1    Sep. 28, 2017

Related U.S. Application Data

(63) Continuation of application No. PCT/CN2016/072134, filed on Jan. 26, 2016.

(30) Foreign Application Priority Data

Feb. 13, 2015  (CN) .......................... 2015 1 0080999

(51) Int. Cl.
*H04L 12/721* (2013.01)
*G06F 16/955* (2019.01)
(Continued)

(52) U.S. Cl.
CPC .......... *H04L 45/123* (2013.01); *G06F 16/955* (2019.01); *G06F 16/9566* (2019.01);
(Continued)

(58) Field of Classification Search
None
See application file for complete search history.

(56) References Cited

U.S. PATENT DOCUMENTS

2009/0006556 A1    1/2009  Agarwal et al.
2013/0014258 A1 *  1/2013  Williams ........... G06Q 30/0241
                                                      726/24
(Continued)

FOREIGN PATENT DOCUMENTS

CN    102402558 A    4/2012
CN    102984287 A    3/2013
(Continued)

OTHER PUBLICATIONS

International Search Report and Written Opinion dated Apr. 19, 2016 for International Application No. PCT/CN2016/072134, 16 pages.

*Primary Examiner* — Mohamed A Kamara
*Assistant Examiner* — Saad Khawar
(74) *Attorney, Agent, or Firm* — Brinks Gilson & Lione

(57) ABSTRACT

Network link processing method, apparatus, and system are disclosed. For example, the method includes: generating an interface-invocation request carrying a target link, a number of bytes of the target link being greater than a preset threshold; sending the interface-invocation request to an open platform server; receiving a unique identifier string sent by the open platform server, a number of bytes of the unique identifier string being less than the preset threshold; and providing the unique identifier string to a client.

18 Claims, 5 Drawing Sheets

(51) Int. Cl.
*H04L 29/08* (2006.01)
*H04L 1/18* (2006.01)
*H04L 1/16* (2006.01)
*H04L 29/06* (2006.01)

(52) U.S. Cl.
CPC ............ *H04L 67/146* (2013.01); *H04L 67/20* (2013.01); *H04L 1/1607* (2013.01); *H04L 1/1887* (2013.01); *H04L 29/08* (2013.01); *H04L 67/1004* (2013.01); *H04L 67/42* (2013.01)

(56) References Cited

U.S. PATENT DOCUMENTS

2013/0024535 A1* 1/2013 Zhang .................. G06F 16/955
709/206
2014/0306019 A1* 10/2014 Windmueller ........... G06K 9/36
235/494
2015/0193600 A1* 7/2015 Matsuda ............. H04L 63/0823
726/9

FOREIGN PATENT DOCUMENTS

CN 103632184 A 3/2014
CN 104702677 A 6/2015

* cited by examiner

LINK PROCESSING METHOD, APPARATUS, AND SYSTEM

CROSS REFERENCE TO RELATED APPLICATIONS

This application is a continuation of International Patent Application PCT/CN2016/072134, filed Jan. 26, 2016, which claims priority to Chinese Patent Application No. 201510080999.X, entitled "LINK PROCESSING METHOD, APPARATUS, AND SYSTEM", filed with the Chinese Patent Office on Feb. 13, 2015, both of which are incorporated herein by reference in their entirety.

FIELD OF THE TECHNOLOGY

Embodiments of the present disclosure relate to the fields of computer and Internet technologies, and in particular, to a link processing method, apparatus, and system.

BACKGROUND OF THE DISCLOSURE

Common users and operators both can apply for a user account in a social application. The operators can provide services such as search, notification, consultation, and customer service to the common users by using the social application.

In the existing technology, a social application can provide an open platform to an operator, and a user account applied by the operation in the social application can be referred to as an official account. A common user can become a follower of the official account after following the official account applied by the operator in the social application. The operator can provide various information and services to the follower by using the open platform.

In implementing embodiments of the present disclosure, the inventor finds that the related technology has at least the following problems:

An operator generally use a URL (Uniform Resource Locator) link to provide various information and services to a follower, but an excessively long URL link (that is, a quantity or number of bytes of the URL link is excessive) may affect common provision of the information and services. For example, when a client of the follower obtains two dimensional code generated by an excessively long URL link, the two dimensional code may be recognized quite slowly and even cannot be recognized.

SUMMARY

To resolve a problem in the related technology that an operator is affected to normally provide various information and services to a follower because a link is excessively long, embodiments of the present disclosure provide a link processing method, apparatus, and system. The technical solutions are as follows According to a first aspect, a network link processing method is provided, and the method includes:

generating an interface-invocation request carrying a target link, a number of bytes of the target link being greater than a preset threshold, the interface-invocation request being used for invoking a preset interface of an open platform server, the preset interface being used for generating an unique identifier string corresponding to the target link, and a number of bytes of the unique identifier string being less than the preset threshold;

sending the interface-invocation request to the open platform server;

receiving the unique identifier string sent by the open platform server; and providing the unique identifier string to a client.

In one implementation, the providing the unique identifier string to a client includes providing graphic code generated by encoding the unique identifier string to the client.

In one implementation, before the generating an interface-invocation request carrying a target link, the method further includes:

sending a request for obtaining credential to the open platform server, the request for obtaining credential carrying an unique identifier and a key corresponding to a target user account, and the target user account being a user account of an operator in the open platform server; and receiving an interface-invocation credential sent by the open platform server; and wherein the interface-invocation request further carries the interface-invocation credential.

In another implementation, the method further includes detecting that a number of bytes of a new added target link is greater than the preset threshold.

According to a second aspect, a network link processing method is provided, and the method includes:

receiving, by an open platform server, an interface-invocation request sent by a third-party server, the interface-invocation request carrying a target link, and a number of bytes of the target link being greater than a preset threshold;

invoking, by the open platform server, a preset interface to generate a unique identifier string corresponding to the target link, a number of bytes of the unique identifier string being less than the preset threshold; and feeding back, by the open platform server, the unique identifier string to the third-party server, so that the third-party server provides the unique identifier string to a client.

In one implementation, after the feeding back, by the open platform server, the unique identifier string to the third-party server, the method further includes:

receiving, by the open platform server, a request for obtaining link sent by the client, the request for obtaining link carrying the unique identifier string;

obtaining, by the open platform server, the target link corresponding to the unique identifier string; and sending, by the open platform server, the target link to the client.

In one implementation, before the receiving, by the open platform server, the interface-invocation request sent by the third-party server, the method further includes:

receiving, by the open platform server, a request for obtaining credential sent by the third-party server, the request for obtaining credential carrying an unique identifier and a key that are corresponding to a target user account, and the target user account being a user account of an operator in the open platform server;

detecting, by the open platform server, whether the unique identifier and the key are correct;

generating, by the open platform server, an interface-invocation credential if the unique identifier and the key are correct; and feeding back, by the open platform server, the interface-invocation credential to the third-party server.

In another implementation, the interface-invocation request further carries the interface-invocation credential, and before the invoking, by the open platform server, the preset interface to generate the unique identifier string corresponding to the target link, the method further includes:

reading, by the open platform server, the interface-invocation credential carried in the interface-invocation request;

verifying, by the open platform server, that the interface-invocation credential is valid.

According to a third aspect, a link processing apparatus is provided, and the apparatus includes:

a memory comprising instructions; and at least one processor in communication with the memory;

wherein the at least one processor, when executing the instructions, is configured to cause the apparatus to:

generate an interface-invocation request carrying a target link, a number of bytes of the target link being greater than a preset threshold, the interface-invocation request being used for invoking a preset interface of an open platform server, the preset interface being used for generating an unique identifier string corresponding to the target link, and a number of bytes of the unique identifier string being less than the preset threshold;

send the interface-invocation request to the open platform server;

receive the unique identifier string sent by the open platform server; and provide the unique identifier string to a client.

In one implementation, the at least on processor, when executing the instructions to cause the apparatus to provide the unique identifier string to the client, is configured to cause the apparatus to provide graphic code generated by encoding the unique identifier string to the client.

In another implementation, the at least one processor, when executing the instructions, is further configured to cause the apparatus to:

send a request for obtaining credential to the open platform server, the request for obtaining credential carrying an unique identifier and a key that are corresponding to a target user account, and the target user account being a user account of an operator in the open platform server; and receive an interface-invocation credential sent by the open platform server, wherein the interface-invocation request further carries the interface-invocation credential.

In another implementation, the at least one processor, when executing the instructions, is further configured to cause the apparatus to detect that a number of bytes of a new added target link is greater than the preset threshold.

According to a fourth aspect, a link processing open platform server is provided, including:

a memory comprising instructions; and at least one processor in communication with the memory;

wherein the at least one processor, when executing the instructions, is configured to cause the server to:

receive an interface-invocation request sent by a third-party server, the interface-invocation request carrying a target link, and a number of bytes of the target link being greater than a preset threshold;

invoke a preset interface to generate a unique identifier string corresponding to the target link, a number of bytes of the unique identifier string being less than the preset threshold; and feed back the unique identifier string to the third-party server, so that the third-party server provides the unique identifier string to a client.

In one implementation, the at least one processor, when executing the instructions, is further configured to cause the server further to:

receive a request for obtaining link sent by the client, the request for obtaining link carrying the unique identifier string;

receive a request for obtaining link sent by the client, the request for obtaining link carrying the unique identifier string;

obtain the target link corresponding to the unique identifier string; and send the target link to the client.

In another implementation, the at least one processor, when executing the instructions, is further configured to cause the server further to:

receive a request for obtaining credential sent by the third-party server, the request for obtaining credential carrying an unique identifier and a key that are corresponding to a target user account, and the target user account being a user account of an operator in the open platform server;

detect whether the unique identifier and the key are correct;

generate an interface-invocation credential when the unique identifier and the key are correct; and feed back the interface-invocation credential to the third-party server.

In another implementation, wherein the interface-invocation request further carries the interface-invocation credential, and the at least one processor, when executing the instructions, is further configured to cause the server to:

read the interface-invocation credential carried in the interface-invocation request; and verify whether the interface-invocation credential is valid.

According to a fifth aspect, a network link processing system is provided, and the system includes: a third-party server and an open platform server;

wherein the third party server comprises:

a first memory comprising first instructions; and at least one first processor in communication with the first memory;

wherein the at least one first processor, when executing the first instructions, is configured to cause the third-party server to:

generate an interface-invocation request carrying a target link, a number of bytes of the target link being greater than a preset threshold, the interface-invocation request being used for invoking a preset interface of the open platform server, the preset interface being used for generating an unique identifier string corresponding to the target link, and a number of bytes of the unique identifier string being less than the preset threshold;

send the interface-invocation request to the open platform server;

receive the unique identifier string sent by the open platform server; and provide the unique identifier string to a client, and wherein the open platform server comprises:

a second memory comprising second instructions; and at least one second processor in communication with the second memory;

wherein the at least one second processor, when executing the second instructions, is configured to cause the open platform server to:

receive the interface-invocation request sent by the third-party server;

invoke the preset interface to generate the unique identifier string corresponding to the target link; and feed back the unique identifier string to the third-party server, so that the third-party server provides the unique identifier string to the client Beneficial effects of the technical solutions provided in the embodiments of the present disclosure include: a preset interface provided by an open platform server is invoked, the preset interface converts a target link having more bytes into a unique identifier string having fewer bytes, and then the unique identifier string is provided to a client. A problem in the related technology that an operator is affected to normally provide various information and services to a follower because a network link is excessively long is resolved. After a long link is converted into a unique identifier string having fewer bytes, the unique identifier string is used to provide information and services to a follower, thereby ensuring that the operator accurately and normally provides the information and services to the follower.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes implementation manners of the present disclosure in detail with reference to the accompanying drawings.

Firstly, some terms involved in embodiments of the present disclosure are defined and described:

1. User account: referring to an account applied by an operator on an open platform. The operator generally refers to an institution or individual having relatively high user attention, such as a merchant, an enterprise, a government, media, or a celebrity. This kind of user account may also be referred to as an official account.

2. Operator: referring to an owner of a user account, that is, an institution or individual applying for the user account, and the operator is also referred to as an operator of an official account.

3. Open platform: referring to a platform that provides an interface to a third-party server based on an original software system, and enhances a function of the original software system or uses resources of the original software system by means of access of the third-party server, for example, a WeChat public platform, an Alipay service window platform, and a Baidu Connect platform. The original software system may be a social application system, a payment application system, or another related application system. Using the social application system as an example, after an operator applies for a user account on an open platform in the social application system, a common user in the social application system can follow the user account, or establish a friend relationship with the user account. Later, the common user and the operator can perform interaction of text, picture, voice, video, and the like by using the social application as a medium.

Figure 1:
FIG. 1 is a schematic structural diagram of an implementation environment according to an embodiment of the present disclosure.

Referring to FIG. 1, FIG. 1 is a schematic structural diagram of an implementation environment according to an embodiment of the present disclosure. The implementation environment includes: a third-party server 120 and an open platform server 140.

The third-party server 120 may be a server, or a server cluster formed by several servers, or a cloud computing service center.

The third-party server 120 is connected to the open platform server 140 by using a wired network or a wireless network.

The open platform server 140 may be a server, or a server cluster formed by several servers, or a cloud computing service center. The open platform server 140 is configured to provide an interface to the third-party server 120 based on an original software system. For example, the open platform server 140 may provide an interface to the third-party server 120 based on a social application system. Alternatively, the open platform server 140 may provide an interface to the third-party server 120 based on a Wechat system, so as to enhance a function of the Wechat system or use resources of the Wechat system.

In a possible implementation manner, the third-party server 120 may be a background server used by an operator to provide various services to a follower of an official account, and the open platform server 140 may be a public platform server for different third-party servers 120 to access.

It should be noted that the "third-party" in "the third-party server" involved in this embodiment of the present disclosure is with respect to "the open platform server", which does not mean that "the third-party server" and "the open platform server" belong to different owners, but "the third-party server" and "the open platform server" may belong to different servers of a same owner.

In this embodiment of the present disclosure, the open platform server 140 provides a preset interface to the third-party server 120, the open platform server 140 converts a long link having more bytes into a unique identifier string having fewer bytes by invoking the preset interface, then the third-party server 120 provides information and services to a client of a follower of a target user account by using the unique identifier string. The target user account is a user account applied by an operator in the open platform server 140.

Figure 2:
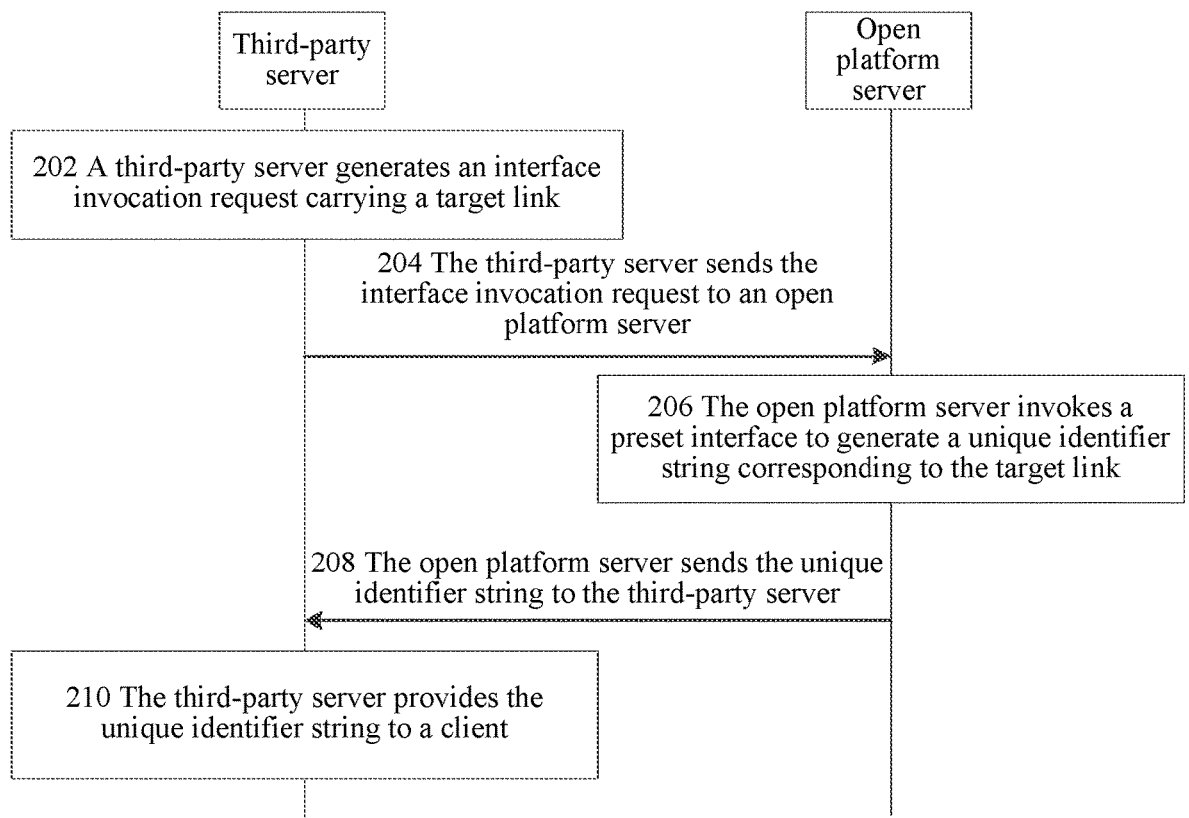
FIG. 2 is a method flowchart of a link processing method according to an embodiment of the present disclosure.

FIG. 2 is a method flowchart of a link processing method according to an embodiment of the present disclosure. This embodiment illustrates an example in which the link processing method is applied to the implementation environment shown in FIG. 1. The link processing method may include the following steps:

Step 202: A third-party server generates an interface-invocation request carrying a target link.

A quantity or number (used interchangeably) of bytes of the target link is greater than a preset threshold. The interface-invocation request is used for invoking a preset interface of an open platform server, and the preset interface is configured to generate a unique identifier string corresponding to the target link. A quantity or number (used interchangeably) of bytes of the unique identifier string is less than the preset threshold.

Optionally, when a quantity of bytes of a new added target link is detected to be greater than the preset threshold, an interface-invocation request carrying the target link is generated. Corresponding processing may be:

The third-party server may detect all stored links, and if the third-party server detects that quantities of bytes of multiple links are greater than the preset threshold, the third-party server may generates interface-invocation requests for the multiple links, each interface-invocation request carrying a corresponding link. For example, when a new given official account goes online, a skilled person sets multiple links, and stores the links to a third-party server. The third-party server may detect all the stored links, and if third-party server detects that quantities of bytes of multiple links are greater than a preset threshold, the third-party server can generate interface-invocation requests for the multiple links, each interface-invocation request carrying a corresponding link.

Alternatively, when the third-party server detects a new added link, the third-party server determines the new added link as the target link, then the third-party server may calculate a quantity of bytes of the target link, and if the quantity of bytes of the target link is greater than the preset threshold, the third-party server generates an interface-invocation request carrying the target link.

Alternatively, the third-party server may periodically detects all links that are newly added within a period, and if the third-party server detects that a quantity of bytes of a given link is greater than the preset threshold, the third-party server may determine the link as the target link, then the third-party server may generate an interface-invocation request carrying the target link.

Step 204: The third-party server sends the interface-invocation request to an open platform server.

Correspondingly, the open platform server receives the interface-invocation request sent by the third-party server.

Step 206: The open platform server invokes a preset interface to generate a unique identifier string corresponding to the target link.

Step 208: The open platform server sends the unique identifier string to the third-party server.

Correspondingly, the third-party server receives the unique identifier string sent by the open platform server.

Step 210: The third-party server provides the unique identifier string to a client.

It should be noted that step 202, step 204, and step 210 may be individually implemented to become a link processing method on the third-party server side, and step 206 and step 208 may be individually implemented to become a link processing method on the open platform server side.

It should be further noted that this embodiment merely describes an example in which an operator of a target user account performs interaction with an open platform server by using a third-party server. In another possible implementation manner, an operator of a target user account may perform interaction with an open platform server by using a client program. Alternatively, an operator of a target user account may further log on to a third-party server by using a client program, and control, by using the client program, the third-party server to perform interaction with an open platform server. This is not limited to this embodiment.

Based on the foregoing description, according to the link processing method provided by this embodiment, a preset interface provided by an open platform server is invoked, the preset interface converts a target link having more bytes into a unique identifier string having fewer bytes, then a third-party server provides the unique identifier string to a client. A problem in the related technology that an operator is affected to normally provide various information and services to a follower because a link is excessively long is resolved. After a long link is converted into a unique identifier string having fewer bytes, the unique identifier string is used to provide information and services to a follower, thereby ensuring that the operator accurately and normally provides the information and services to the follower.

Figure 3A:
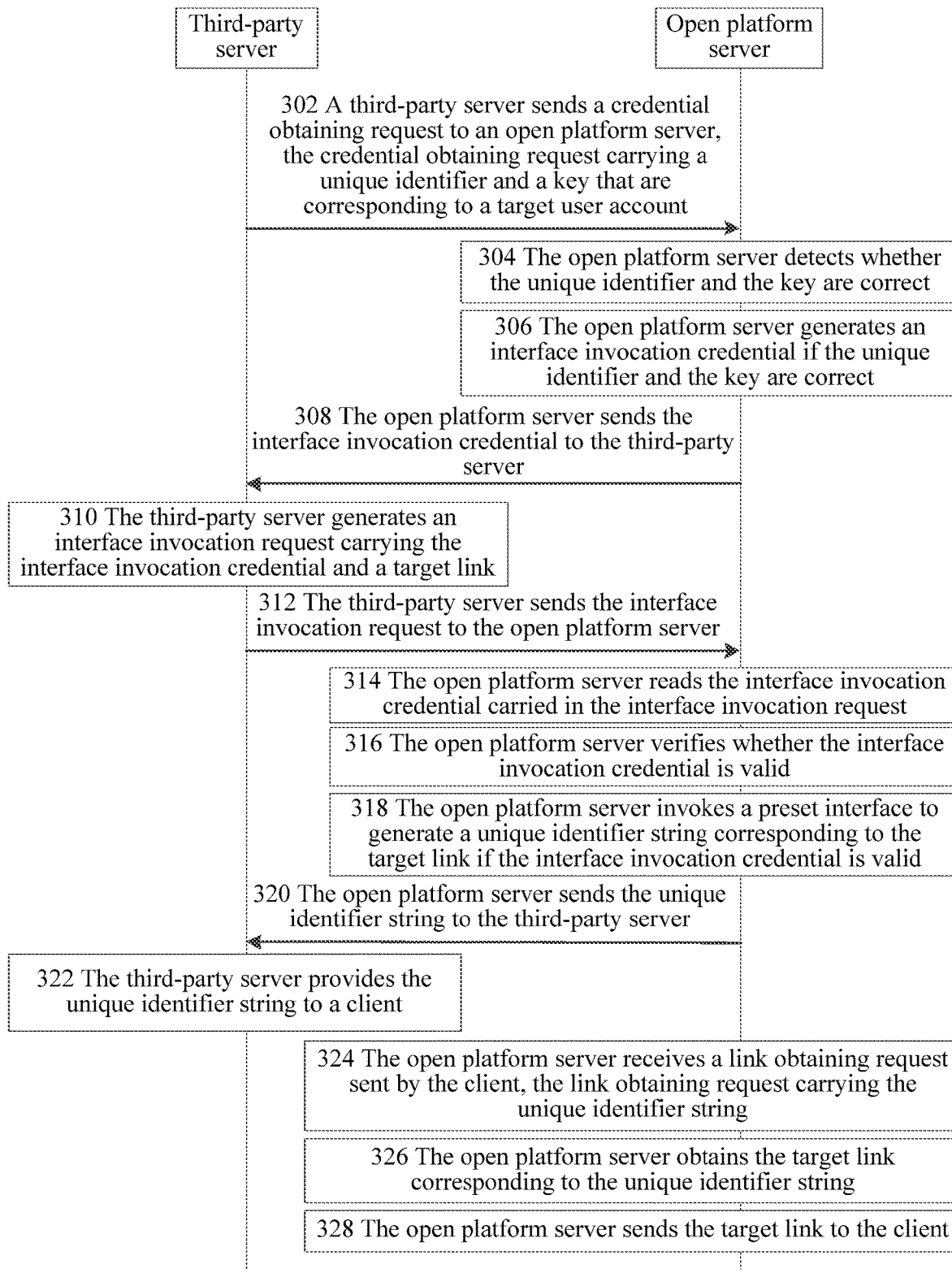
FIG. 3A is a method flowchart of a link processing method according to another embodiment of the present disclosure.

FIG. 3A is a method flowchart of a link processing method according to another embodiment of the present disclosure. This embodiment describes an example in which the link processing method is applied to the implementation environment shown in FIG. 1. The link processing method may include the following steps:

Step 302: A third-party server sends a request for obtaining credential to an open platform server, the request for obtaining credential carrying a unique identifier and a key that are corresponding to a target user account.

The target user account is a user account applied by an operator in the open platform server, and the operator provides various services to a follower of the target user account by using the third-party server. The unique identifier and the key are obtained by the third-party server from the open platform server in advance. For example, the open platform server may send the corresponding unique identifier and key to the third-party server after completing registering the target user account.

Optionally, the third-party server may invoke a credential obtaining interface provided by the open platform server, the credential obtaining interface being configured to provide an interface-invocation credential to the third-party server.

For example, a request protocol used by the request for obtaining credential is the HTTPS (Hyper Text Transfer Protocol over Secure Socket Layer), and a request manner is a GET request manner. A request example of the request for obtaining credential is as follows: https://api.xxxxx.com/cgi-bin/token?grant_type=client_credential&appid=APPID&secret=APPSECRET.

Parameter descriptions of the request for obtaining credential is shown in Table-1 below:

TABLE 1

| Parameter | Description |
| --- | --- |
| grant_type | used for indicating to obtain an interface-invocation credential access_token |
| appid | unique identifier |
| secret | key |

Correspondingly, the open platform server receives the request for obtaining credential sent by the third-party server.

Step 304: The open platform server detects whether the unique identifier and the key are correct.

Step 306: The open platform server generates an interface-invocation credential if the unique identifier and the key are correct.

The interface-invocation credential is a credential for the third-party server to invoke a preset interface configured to convert a long link. The open platform server may generate the interface-invocation credential according to the unique identifier and the key that are corresponding to the target user account, and the open platform server may add the target user account, the key, and the interface-invocation credential into a correspondence between a user account and an interface-invocation credential. For example, the unique identifier and the key are calculated according to a preset algorithm to obtain the interface-invocation credential. The interface-invocation credential may be a character string. Alternatively, in another possible implementation manner, the interface-invocation credential may also be a randomly generated character string.

Optionally, the open platform server may further set a credential valid time corresponding to the interface-invocation credential. The interface-invocation credential is valid within the credential valid time; otherwise, the interface-invocation credential expires and becomes invalid.

Step 308: The open platform server sends the interface-invocation credential to the third-party server.

For example, the open platform server sends returned data in a JSON (JavaScript Object Notation, a lightweight data exchange format) format, and the returned data is as follows: {"access_token":"ACCESS_TOKEN","expires_in":7200}.

Parameter descriptions of the returned data is shown in Table-2 below:

TABLE 2

| Parameter | Description |
| --- | --- |
| access_token | interface-invocation credential |
| expires_in | Credential valid time, unit: second |

Correspondingly, the third-party server receives the interface-invocation credential sent by the open platform server.

In addition, the open platform server may return incorrect code and/or incorrect information to the third-party server when the unique identifier and the key are incorrect.

Step 310: The third-party server generates an interface-invocation request carrying the interface-invocation credential and a target link.

A quantity of bytes of the target link is greater than a preset threshold. The target link is generally a URL, and the URL may refer to a given resource on the Internet, such as a payment page, a goods display page, and an information page. The third-party server provides corresponding information and services to a follower of the target user account.

The interface-invocation request is used for invoking a preset interface of the open platform server, and the preset interface is configured to generate a unique identifier string corresponding to the target link. A quantity of bytes of the unique identifier string is less than the preset threshold. The preset threshold is an empirical value that is preset according to an actual requirement, such as 30. When a quantity of bytes of a given link is greater than the preset threshold, it may be considered that the link is a long link.

Optionally, a request protocol used by the interface-invocation request may be the HTTP (Hypertext Transfer Protocol), or may be the HTTPS, or another customized protocol. A request manner used by the interface-invocation request may be a POST request manner or a GET request manner.

Optionally, the interface-invocation request may further carry an interface address corresponding to the preset interface, and the interface address is used for indicating an interface that needs to be invoked.

For example, in a specific example, a request protocol used by the interface-invocation request is the HTTPS, a request manner is the POST request manner, and a request example of the interface-invocation request is as follows:

https://api.xxxxx.com/cgi-bin/shorturl?access_token=ACCESS_TOKEN

An POST data example carried in the interface-invocation request is as follows: {\"action\":\"long2short\",\"long_url\":\"http://wap.koudaitong.com/v2/showcase/goods?alias=12 8wi9shh&spm=h56083&redirect_count=1\"}.

Parameter descriptions of the interface-invocation request is shown in Table-3 below:

TABLE 3

| Parameter | Description |
| --- | --- |
| access_token | interface-invocation credential |
| action | long2short, indicating a link conversion operation |
| long_url | target link that needs to be processed |

Step 312: The third-party server sends the interface-invocation request to the open platform server.

Correspondingly, the open platform server receives the interface-invocation request sent by the third-party server.

Step 314: The open platform server reads the interface-invocation credential carried in the interface-invocation request.

Step 316: The open platform server verifies whether the interface-invocation credential is valid.

The open platform server may verify whether the interface-invocation credential is correct, and may verify whether the interface-invocation credential expires. If the interface-invocation credential is correct and does not expire, it is indicated that the interface-invocation credential is valid.

A skilled person may preset the credential valid time (for example, two hours) of the interface-invocation credential, and stores the interface-invocation credential to the open platform server. After the open platform server reads the interface-invocation credential carried in the interface-invocation request, the open platform server may check whether there is the interface-invocation credential in a correspondence between a stored user account, a key, and an interface-invocation credential. If there is the interface-invocation credential, the open platform server may parse the interface-invocation credential, obtain the target user account and the key in the interface-invocation credential, then check the correspondence between the stored user account, the key, and the interface-invocation credential. If the target user account and the key corresponding to the interface-invocation credential are the same as the stored target user account and the key, the interface-invocation credential is correct. Thereafter, the open platform server may obtain the credential valid time (for example, two hours) corresponding to the interface-invocation credential, and check whether a use time of the interface-invocation credential is within the credential valid time corresponding to the interface-invocation credential. If the interface-invocation credential is within the credential valid time, it is considered that the interface-invocation credential is valid.

In addition, the skilled person may preset the credential valid time of the interface-invocation credential, and stores the interface-invocation credential to the open platform server. When a use time of a given interface-invocation credential reaches the credential valid time, the open platform server may delete the interface-invocation credential. In this way, after the open platform server reads the interface-invocation credential carried in the interface-invocation request, the open platform server may check whether there is the interface-invocation credential in the correspondence between the stored target user account, the key, and the interface-invocation credential. If there is the interface-invocation credential, interface-invocation credential is valid, and then the open platform server may parse the interface-invocation credential, and obtain the target user account and the key in the interface-invocation credential. The open platform server may check the correspondence between the stored target user account, the key, and the interface-invocation credential, and if the target user account and the key that are corresponding to the interface-invocation credential are the same as the stored target user account and the key, the interface-invocation credential is correct.

Step 318: The open platform server invokes a preset interface to generate a unique identifier string corresponding to the target link if the interface-invocation credential is valid.

When the interface-invocation credential is valid, the open platform server invokes, according to an interface address carried in the interface-invocation request, a preset interface corresponding to the interface address, and generates a unique identifier string corresponding to the target link by using the preset interface. A quantity of bytes of the unique identifier string is less than the preset threshold. For example, the open platform server generates a unique identifier string corresponding to the foregoing target link "http://wap.koudaitong.com/v2/showcase/goods?alias= 128wi9shh&spm=h56083&redirect_count=1\" is "http: VVw.url.cnVsVAvCo6Ih".

In addition, after the open platform server generates the unique identifier string corresponding to the target link, the open platform server stores the target link, the unique identifier string, and a correspondence between the two.

Step 320: The open platform server sends the unique identifier string to the third-party server.

Optionally, the open platform server sends returned data in a JSON format to the third-party server, the returned data carrying the unique identifier string.

Optionally, when the interface-invocation credential is invalid, for example, when the interface-invocation credential is incorrect or the interface-invocation credential expires, the open platform server may directly end a process, or may return corresponding incorrect code and/or incorrect information to the third-party server. Alternatively, when the interface-invocation request does not carry the interface-invocation credential, the open platform server may directly end a process, or may return corresponding incorrect code and/or incorrect information to the third-party server.

Correspondingly, the third-party server receives the unique identifier string sent by the open platform server.

Step 322: The third-party server provides the unique identifier string to a client.

The client is a client corresponding to a follower account that follows the target user account, and the target user account is a user account corresponding to the third-party server. When the third-party server needs to provide information and services to the client by using the target link, the third-party server may provide the unique identifier string to the client. Correspondingly, the client may obtain the related information and services according to the unique identifier string.

In a possible implementation manner, the third-party server provides graphic code generated by encoding of the unique identifier string, to the client. The graphic code includes but is not limited to at least one of bar code and two dimensional code.

In addition, the third-party server may encode the unique identifier string locally to generate the graphic code. Alternatively, the third-party server may sends a graphic-code generation request carrying the unique identifier string to the open platform server, the graphic-code generation request being used for triggering the open platform server to encode the unique identifier string to generate the graphic code, later, the third-party server receives the graphic-code sent by the open platform serve. Alternatively, the open platform server may directly encode the generated unique identifier string to generate the graphic code after step 318, and send the graphic-code to the third-party server.

Figure 3B:
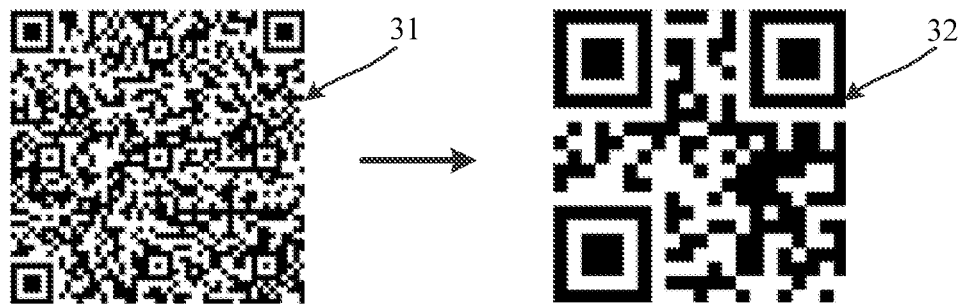
FIG. 3B is a schematic diagram of two dimensional code according to another embodiment of the present disclosure.

Turning to FIG. 3B, FIG. 3B shows a difference between two dimensional code 31 generated by directly encoding the target link and two dimensional code 32 generated by encoding the unique identifier string corresponding to the target link as an example. Compared with the two dimensional code 31 generated by directly encoding the target link, the two dimensional code 32 generated by encoding the unique identifier string corresponding to the target link is simpler, and a corresponding recognition speed and recognition success rate may be improved.

Returning Step 324 of FIG. 3A: The open platform server receives a request for obtaining link sent by the client, the request for obtaining link carrying the unique identifier string.

After a follower receives the unique identifier string from the client, the follower may send a request for obtaining link carrying the unique identifier string to the open platform server, the request for obtaining link being used for requesting for obtaining the target link corresponding to the unique identifier string.

Optionally, when the client receives the graphic code generated by encoding of the unique identifier string, the client may scan the graphic code by using a scanning tool, and decode the graphic code to obtain the unique identifier string.

Step 326: The open platform server obtains the target link corresponding to the unique identifier string.

The open platform server obtains the target link corresponding to the unique identifier string according to a correspondence between a stored unique identifier string and a target link.

Step 328: The open platform server sends the target link to the client.

After the client obtains the target link, the client can further obtain resources that the target link points to, so as to achieve to provide information and services to a follower.

It should be noted that step 302, step 310, step 312, and step 322 may be individually implemented to become a link processing method on the third-party server side, and step 304 to step 308, step 314 to step 320, and step 324 to step 328 may be individually implemented to become a link processing method on the open platform server side individually.

It should be further noted that step 302 to step 308 are merely optional, and may not be executed in another possible implementation manner. Correspondingly, the interface-invocation request sent by the third-party server to the open platform server may not carry the interface-invocation credential. This is not limited to this embodiment.

It should be further noted that this embodiment merely performs description by using an example in which an operator of a target user account performs interaction with an open platform server by using a third-party server. In another possible implementation manner, an operator of a target user account may perform interaction with an open platform server by using a client program. Alternatively, an operator of a target user account may further log on to a third-party server by using a client program, and control, by using the client program, the third-party server to perform interaction with an open platform server. This is not limited to this embodiment.

Based on the foregoing description, according to the link processing method provided by this embodiment, a preset interface provided by an open platform server is invoked, the preset interface converts a target link having more bytes into a unique identifier string having fewer bytes, then a third-party server provides the unique identifier string to a client. A problem in the related technology that an operator is affected to normally provide various information and services to a follower because a link is excessively long is resolved. After a long link is converted into a unique identifier string having fewer bytes, the unique identifier string is used to provide information and services to a follower, thereby ensuring that the operator accurately and normally provides the information and services to the follower.

In addition, according to the link processing method provided by this embodiment, a third-party server provides graphic code generated by encoding of a unique identifier string, to a client, so as to improve a recognition speed and a recognition success rate in a scanning process of the client, thereby ensuring that the client can obtain corresponding information and services efficiently and accurately.

In addition, according to a link processing method provided by this embodiment, permission for a third-party server to invoke a preset interface is managed and maintained by using an interface-invocation credential, so that unnecessary processing overhead caused by some malicious parties randomly invoking the preset interface is avoided, thereby providing security protection for invoking of the preset interface.

The following is an apparatus embodiment of the present disclosure, which may be used for executing the method embodiment of the present disclosure. For details that are not disclosed in this apparatus embodiment of the present disclosure, refer to the method embodiment of the present disclosure.

Figure 4:
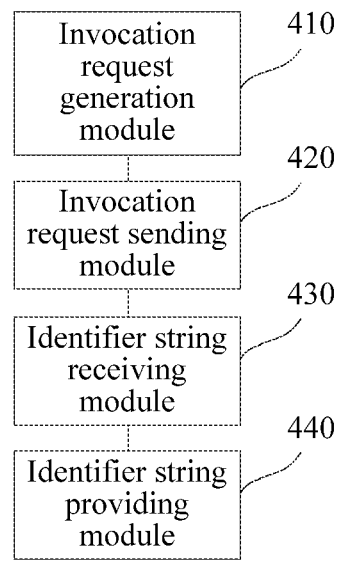
FIG. 4 is a structural block diagram of a link processing apparatus according to an embodiment of the present disclosure.

FIG. 4 is a structural block diagram of a link processing apparatus according to an embodiment of the present disclosure. In a possible implementation manner, the link processing apparatus may be implemented by using software, hardware, or a combination of the two to become part or all of a third-party server. The link processing apparatus may include: an invocation request generation module 410, an invocation request sending module 420, an identifier string receiving module 430, and an identifier string providing module 440.

The invocation request generation module 410 is configured to generate an interface-invocation request carrying a target link, a quantity of bytes of the target link being greater than a preset threshold, the interface-invocation request being used for invoking a preset interface of an open platform server, the preset interface being used for generating an unique identifier string corresponding to the target link, and a quantity of bytes of the unique identifier string being less than the preset threshold.

The invocation request sending module 420 is configured to send the interface-invocation request to the open platform server.

The identifier string receiving module 430 is configured to receive the unique identifier string sent by the open platform server.

The identifier string providing module 440 is configured to provide the unique identifier string to a client.

Based on the foregoing description, according to the link processing apparatus provided by this embodiment, a preset interface provided by an open platform server is invoked, the preset interface converts a target link having more bytes into a unique identifier string having fewer bytes, then the unique identifier string is provided to a client. A problem in the related technology that an operator is affected to normally provide various information and services to a follower because a link is excessively long is resolved. After a long link is converted into a unique identifier string having fewer bytes, the unique identifier string is used to provide information and services to a follower, thereby ensuring that the operator accurately and normally provides the information and services to the follower.

Figure 5:
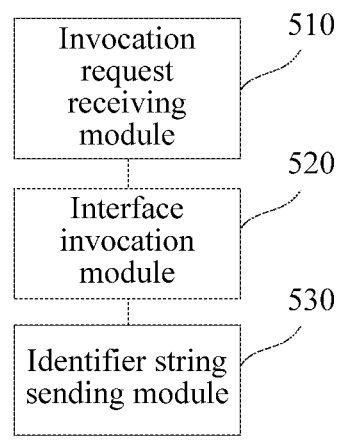
FIG. 5 is a structural block diagram of a link processing apparatus according to another embodiment of the present disclosure.

FIG. 5 is a structural block diagram of a link processing apparatus according to another embodiment of the present disclosure. The link processing apparatus may be implemented by using software, hardware, or a combination of the two to become part or all of an open platform server. The link processing apparatus may include: an invocation request receiving module 510, an interface-invocation module 520, and an identifier string sending module 530.

The invocation request receiving module 510 is configured to receive an interface-invocation request sent by a third-party server 400, the interface-invocation request carrying a target link, and a quantity of bytes of the target link being greater than a preset threshold.

The interface-invocation module 520 is configured to invoke a preset interface to generate a unique identifier string corresponding to the target link, a quantity of bytes of the unique identifier string being less than the preset threshold.

The identifier string sending module 530 is configured to feed back the unique identifier string to the third-party server 400, so that the third-party server 400 provides the unique identifier string to a client.

Based on the foregoing description, according to the link processing apparatus provided by this embodiment, an open platform server provides a preset interface server to a target user account, the preset interface converts a target link having more bytes into a unique identifier string having fewer bytes, then the open platform server provides the unique identifier string to a client. A problem in the related technology that an operator is affected to normally provide various information and services to a follower because a link is excessively long is resolved. After a long link is converted into a unique identifier string having fewer bytes, the unique identifier string is used to provide information and services to a follower, thereby ensuring that the operator accurately and normally provides the information and services to the follower.

Figure 6:
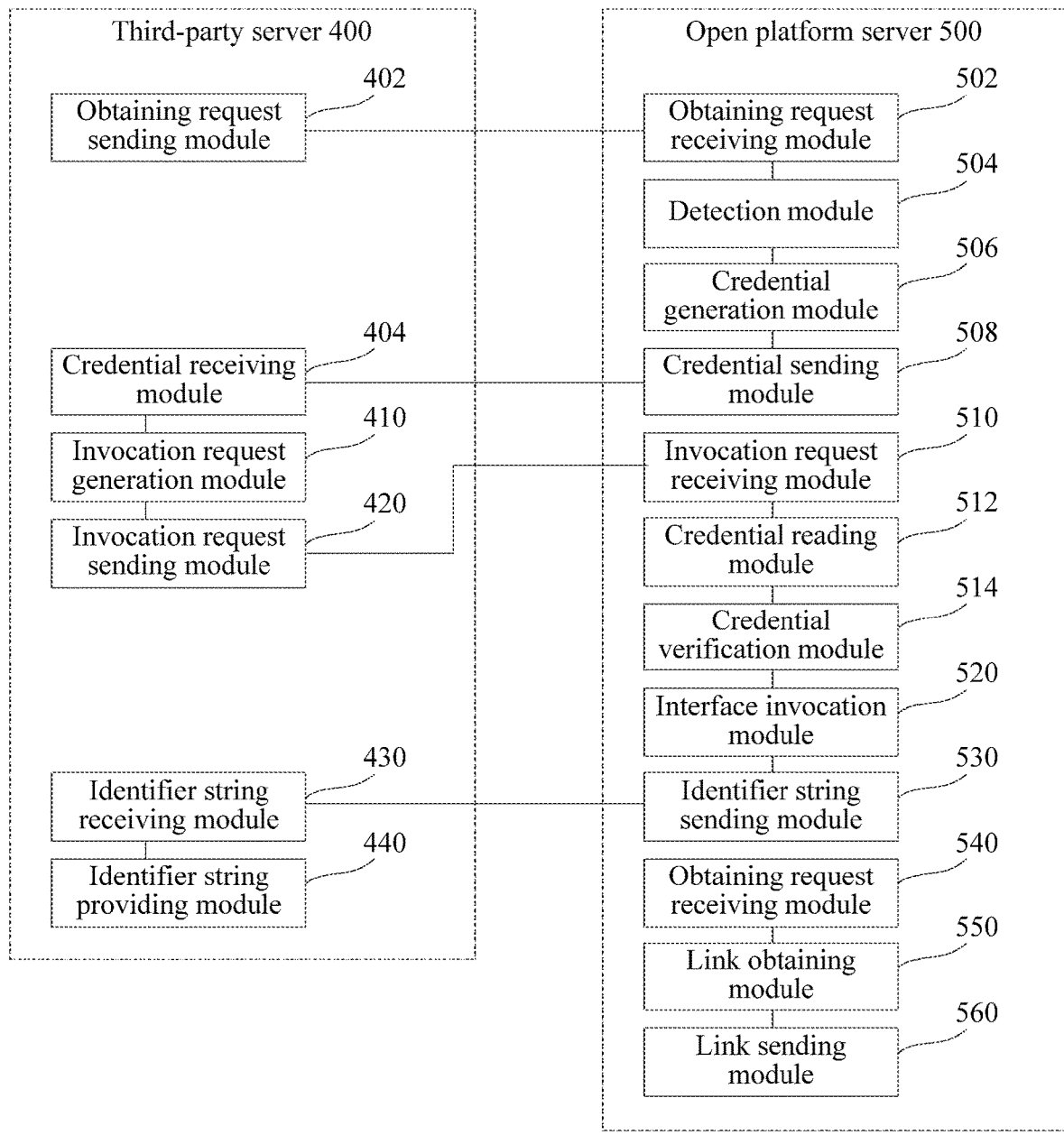
FIG. 6 is a structural block diagram of a link processing system according to an embodiment of the present disclosure.

FIG. 6 is a structural block diagram of a link processing system according to an embodiment of the present disclosure. The link processing system may include: a third-party server 400 and an open platform server 500. The third-party server 400 is connected to the open platform server 500 by using a wired network or a wireless network.

The third-party server 400 may include a link processing apparatus, and the link processing apparatus may be implemented by using software, hardware, or a combination of the two to become part or all of the third-party server 400. The link processing apparatus may include: an invocation request generation module 410, an invocation request sending module 420, an identifier string receiving module 430, and an identifier string providing module 440.

The invocation request generation module 410 is configured to generate an interface-invocation request carrying a target link, a quantity of bytes of the target link being greater than a preset threshold, the interface-invocation request being used for invoking a preset interface of the open platform server 500, the preset interface being used for generating an unique identifier string corresponding to the target link, and a quantity of bytes of the unique identifier string being less than the preset threshold.

The invocation request sending module 420 is configured to send the interface-invocation request to the open platform server 500.

The identifier string receiving module 430 is configured to receive the unique identifier string sent by the open platform server 500.

The identifier string providing module 440 is configured to provide the unique identifier string to a client.

Optionally, the identifier string providing module 440 is specifically configured to provide graphic code generated by encoding of the unique identifier string, to the client.

Optionally, the apparatus further includes: an obtaining request sending module 402 and a credential receiving module 404.

The obtaining request sending module 402 is configured to send a request for obtaining credential to the open platform server 500, the request for obtaining credential carrying an unique identifier and a key that are corresponding to a target user account, and the target user account being a user account applied by an operator in the open platform server.

The credential receiving module 404 is configured to receive an interface-invocation credential sent by the open platform server 500.

The invocation request generation module 410 is specifically configured to generate an interface-invocation request carrying the interface-invocation credential and the target link.

The open platform server 500 may include a link processing apparatus, and the link processing apparatus may be implemented by using software, hardware, or a combination of the two to become part or all of the open platform server 500. The link processing apparatus may include: an invocation request receiving module 510, an interface-invocation module 520, and an identifier string sending module 530.

The invocation request receiving module 510 is configured to receive an interface-invocation request sent by the third-party server 400, the interface-invocation request carrying a target link, and a quantity of bytes of the target link being greater than a preset threshold.

The interface-invocation module 520 is configured to invoke a preset interface to generate a unique identifier string corresponding to the target link, a quantity of bytes of the unique identifier string being less than the preset threshold.

The identifier string sending module 530 is configured to feed back the unique identifier string to the third-party server 400, so that the third-party server 400 provides the unique identifier string to a client.

Optionally, the apparatus further includes: an obtaining request receiving module 540, a link obtaining module 550, and a link sending module 560.

The obtaining request receiving module 540 is configured to receive a request for obtaining link sent by the client, the request for obtaining link carrying the unique identifier string.

The link obtaining module 550 is configured to obtain the target link corresponding to the unique identifier string.

The link sending module 560 is configured to send the target link to the client.

Optionally, the apparatus further includes: an obtaining request receiving module 502, a detection module 504, a credential generation module 506, and a credential sending module 508.

The obtaining request receiving module 502 is configured to receive a request for obtaining credential sent by the third-party server 400, the request for obtaining credential carrying an unique identifier and a key that are corresponding to a target user account, and the target user account being a user account applied by an operator in the open platform server.

The detection module 504 is configured to detect whether the unique identifier and the key are correct.

The credential generation module 506 is configured to generate an interface-invocation credential when the unique identifier and the key are correct.

The credential sending module 508 is configured to feed back the interface-invocation credential to the third-party server 400.

Optionally, the interface-invocation request carries the interface-invocation credential, and the apparatus further includes: a credential reading module 512 and a credential verification module 514.

The credential reading module 512 is configured to read the interface-invocation credential carried in the interface-invocation request.

The credential verification module 514 is configured to verify whether the interface-invocation credential is valid.

The interface-invocation module 520 is specifically configured to invoke the preset interface to generate a unique identifier string corresponding to the target link when the interface-invocation credential is valid.

Based on the foregoing description, according to the link processing system provided by this embodiment, a preset interface provided by an open platform server is invoked, the preset interface converts a target link having more bytes into a unique identifier string having fewer bytes, then a third-party server provides the unique identifier string to a client. A problem in the related technology that an operator is affected to normally provide various information and services to a follower because a link is excessively long is resolved. After a long link is converted into a unique identifier string having fewer bytes, the unique identifier string is used to provide information and services to a follower, thereby ensuring that the operator accurately and normally provides the information and services to the follower.

In addition, according to the link processing system provided by this embodiment, a third-party server provides graphic code generated by encoding of a unique identifier string to a client, so as to improve a recognition speed and a recognition success rate of scanning of the client, thereby ensuring that the client can obtain corresponding information and services efficiently and accurately.

In addition, according to a link processing system provided by this embodiment, permission for a third-party server to invoke a preset interface is managed and maintained by using an interface-invocation credential, so that unnecessary processing overhead caused by some malicious parties randomly invoking the preset interface is avoided, thereby providing security protection for invoking of the preset interface.

It should be noted that division of the above functional modules are only described for exemplary purposes when the link conversion apparatus and system provided by the foregoing embodiments provide a link conversion service. In actual applications, the functions may be allocated to different functional modules according to specific needs, which means that the internal structure of the apparatus is divided into different functional modules to complete all or some of the above described functions. In addition, the link conversion apparatus and system provided by the foregoing embodiments are based on the same concept as the link conversion method in the foregoing embodiments. For the specific implementation process, refer to the method embodiments, and the details are not described herein again.

Figure 7:
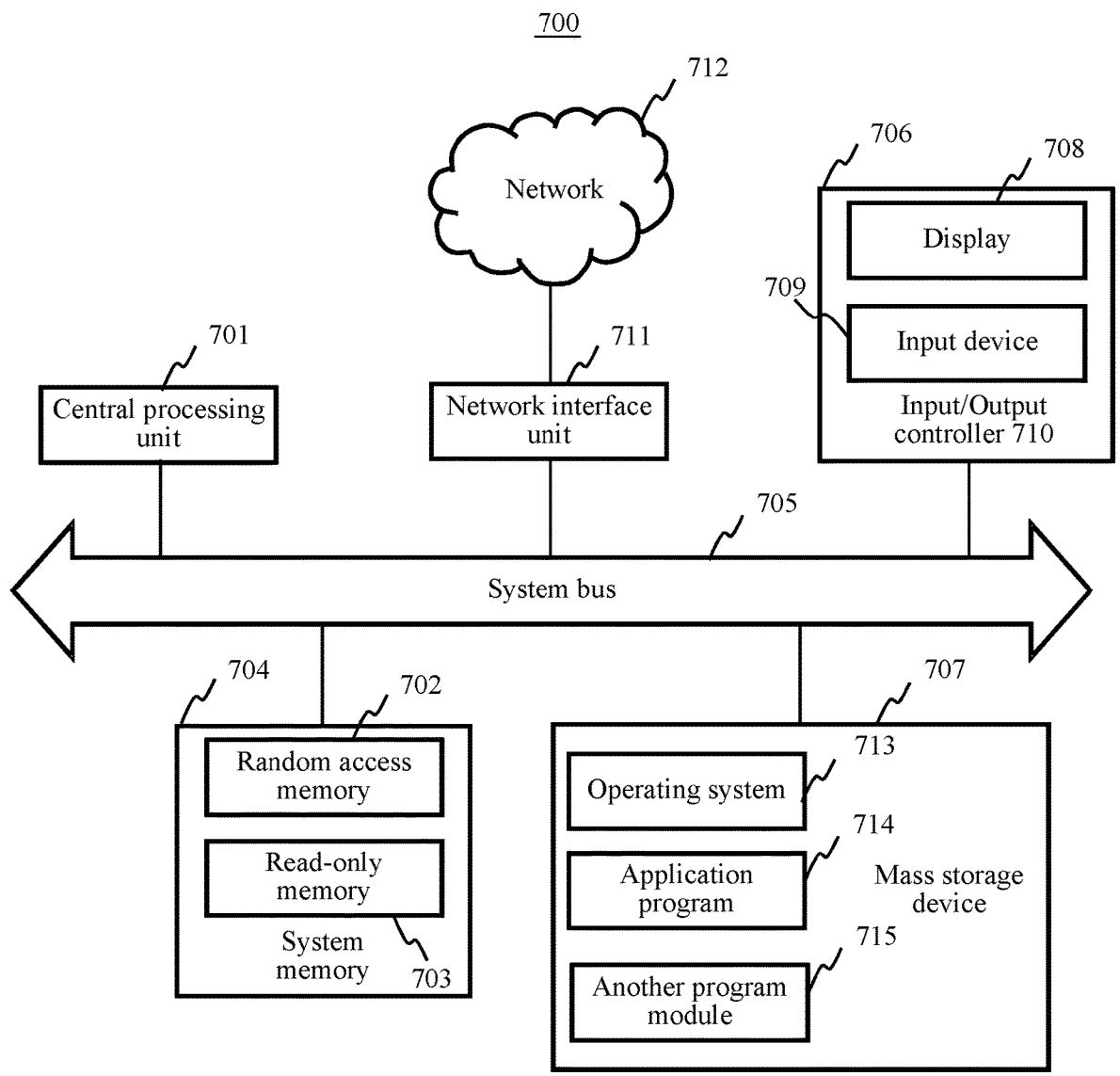
FIG. 7 is a schematic structural diagram of a server according to an embodiment of the present disclosure.

FIG. 7 is a schematic structural diagram of a server according to an embodiment of the present disclosure. The server is configured to implement the link conversion method provided by the foregoing embodiment. The server may be a third-party server, or may be an open platform server. Specifically:

The server 700 includes a central processing unit (CPU) 701, a system memory 704 including a random access memory (RAM) 702 and a read-only memory (ROM) 703, and a system bus 705 connecting the system memory 704 and the central processing unit 701. The server 700 further includes a basic input/output system (I/O system) 706 helping transmit information between components in a computer, and a mass storage device 707 configured to store an operating system 713, an application program 714, and another program module 715.

The basic input/output system 706 includes a display 708 configured to display information and an input device 709, such as a mouse and a keyboard, configured to input information from a user. The display 708 and the input device 709 are both connected to the central processing unit 701 by using an input/output controller 710 that is connected to the system bus 705. The basic input/output system 706 may further include the input/output controller 710 configured to receive and process input from multiple other devices such as the keyboard, the mouse, or an electronic stylus. Similarly, the input/output controller 710 further provides output to a screen, a printer, or an output device of other types.

The mass storage device 707 is connected to the central processing unit 701 by using a mass storage controller (not shown) that is connected to the system bus 705. The mass storage device 707 and a computer readable medium associated with the mass storage device 707 provide non-volatile storage to the server 700. That is, the mass storage device 707 may include the computer readable medium (not shown) such as a hard disk or a CD-ROM driver.

Generally, the computer readable medium may include a computer storage medium and a communications medium. The computer storage medium includes a volatile and non-volatile, movable and immovable medium for any methods or technical implementations storing information such as a computer readable instruction, a data structure, a program module, or other data. The computer storage medium includes a RAM, a ROM, an EPROM, an EEPROM, a flash memory or other solid-state storage and technologies, a CD-ROM, a DVD or other optical storage, a cassette, a magnetic tape, a disk storage or other magnetic storage devices. Certainly, a person skilled in the art may know that the computer storage medium is not limited to the foregoing types. The foregoing system memory 704 and the mass storage device 707 may be collectively referred to as a memory.

According to various embodiments of the present disclosure, the server 700 may further be connected to a remote computer on a network by using the network such as the Internet. That is, the server 700 may be connected to a network 712 by using a network interface unit 711 that is connected on the system bus 705, or may be connected to a network of other types or a remote computer system (not shown) by using the network interface unit 711.

The memory further includes one or more processors. The one or more programs are stored in the memory and configured to be executed by one or more processors. When the server 700 is a third-party server, the one or more programs contain instructions used for executing the link conversion method on the third-party server side provided by the embodiments shown in FIG. 2 or FIG. 3A. When the server 700 is an open platform server, the one or more programs contain instructions used for executing the link conversion method on the open platform server side provided by the embodiments shown in FIG. 2 or FIG. 3A.

It should be understood that the "one" ("a", "an", "the") in a singular form used in the present disclosure is aimed at including a plural form unless that the context clearly supports an exceptional condition. It should be further understood that the "and/or" used in the present disclosure refers to any or all of possible combinations of one or more programs that are listed in an associated manner.

The sequence numbers of the foregoing embodiments of the present disclosure are merely for the convenience of description, and do not imply the preference among the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

What is described above is merely examples of the present disclosure, and is not intended to limit the present disclosure. Any modifications, equivalent variations, and improvements made in accordance with the spirits and principles of the present disclosure shall fall within the protection scope of the present disclosure.

What is claimed is:

1. A network link processing method performed by a third-party service-providing server in communication with an open platform server associated with a social network application, comprising:

obtaining an official user account with the social network application for an operator of the third-party service-providing server, wherein the official user account is configured to be followed by common user accounts established with the social network application directly and distinct from the official user account, and wherein the third-party service-providing server is configured to initiate a link casting service to common followers of the official user account via the open platform server;

initiating an interface-invocation request carrying a target link in URL format, a number of bytes of the target link being greater than a preset threshold, the interface-invocation request being used for invoking a preset interface of the open platform server, the preset interface being used for generating a unique identifier string corresponding to the target link, and a number of bytes of the unique identifier string being less than the preset threshold wherein the unique identifier string is not in a valid URL format;

sending the interface-invocation request to the open platform server;

receiving the unique identifier string sent by the open platform server; and initiating the link casting service by sending a link casting message including the unique identifier string from the official user account to a common user account of a follower of the official user account for the follower to prompt the follower to initiate a process to obtain the target link from the open platform server followed by accessing the target link on a remote resource server.

2. The method according to claim 1, wherein sending the link casting message including the unique identifier string from the official user account to the common user account comprises:

sending a graphic code generated by encoding the unique identifier string from the official user account to the common user account.

3. The method according to claim 1, before generating the interface-invocation request carrying the target link, further comprising:

sending a request for obtaining credential to the open platform server, the request for obtaining credential carrying a unique identifier and a key corresponding to the official user account; and receiving an interface-invocation credential sent by the open platform server, wherein the interface-invocation request further carries the interface-invocation credential.

4. The method according to claim 1, further comprising: detecting that a number of bytes of a new added target link is greater than the preset threshold.

5. A network link processing method performed by an open platform server associated with a social network application and in communication with a third-party service-providing server, comprising:

recognizing an official user account with the social network application for an operator of the third-party service-providing server, wherein the official user account is configured to be followed by common user accounts established with the social network application directly and distinct from the official user account, and wherein the third-party service-providing server is configured to provide services to common followers of the official user account via the open platform server;

receiving, by the open platform server, an interface-invocation request sent by the third-party service-providing server, the interface-invocation request carrying a target link in URL format, and a number of bytes of the target link being greater than a preset threshold;

invoking, by the open platform server, a preset interface to generate a unique identifier string corresponding to the target link and not in a valid URL format, a number of bytes of the unique identifier string being less than the preset threshold;

feeding back, by the open platform server, the unique identifier string to the third-party service-providing server, so that the third-party service-providing server initiates a link casting service by sending a link casting message including the unique identifier string from the official user account to a common user account of a follower of the official user account for the follower to access the target link on a remote resource server via the open platform server;

receiving, by the open platform server, a request for obtaining link sent by the client, the request for obtaining link carrying the unique identifier string;

obtaining, by the open platform server, the target link corresponding to the unique identifier string; and sending, by the open platform server, the target link to the client.

6. The method according to claim 5, before the receiving, by the open platform server, the interface-invocation request sent by the third-party service-providing server, further comprising:

receiving, by the open platform server, a request for obtaining credential sent by the third-party service-providing server, the request for obtaining credential carrying a unique identifier and a key corresponding to the official user account;

detecting, by the open platform server, whether the unique identifier and the key corresponding to the official user account are correct;

generating, by the open platform server, an interface-invocation credential if the unique identifier and the key are correct; and feeding back, by the open platform server, the interface-invocation credential to the third-party service-providing server.

7. The method according to claim 6, wherein the interface-invocation request further carries the interface-invocation credential, and before the invoking, by the open platform server, the preset interface to generate the unique identifier string corresponding to the target link, the method further comprising:

reading, by the open platform server, the interface-invocation credential carried in the interface-invocation request; and verifying, by the open platform server, that the interface-invocation credential is valid.

8. A third-party service-providing server in communication with an open platform server associated with a social network application, comprising:

a memory comprising instructions; and at least one processor in communication with the memory;

wherein the at least one processor, when executing the instructions, is configured to cause the third-party service-providing server to:

obtain an official user account with the social network application for an operator of the third-party service-providing server, wherein the official user account is configured to be followed by common user accounts established with the social network application directly and distinct from the official user account, and wherein the third-party service-providing server is configured to initiate a link casting service to common followers of the official user account via the open platform server;

initiate an interface-invocation request carrying a target link in URL format, a number of bytes of the target link being greater than a preset threshold, the interface-invocation request being used for invoking a preset interface of the open platform server, the preset interface being used for generating a unique identifier string corresponding to the target link and not in a valid URL format, and a number of bytes of the unique identifier string being less than the preset threshold;

send the interface-invocation request to the open platform server;

receive the unique identifier string sent by the open platform server; and initiate the link casting service by sending a link casting message including the unique identifier string from the official account to a common user account of a follower of the official user account for the follower prompt the follower to initiate a process to obtain the target link from the open platform server followed by accessing the target link on a remote resource server.

9. The third-party service-providing server according to claim 8, wherein the at least on processor, when executing the instructions to cause the third-party service-providing server to send the link casting message including the unique identifier string from the official user account to the common user account, is configured to cause the third-party service-providing server to:

send a graphic code generated by encoding the unique identifier string from the official user account to the common user account.

10. The third-party service-providing server according to claim 8, the at least one processor, when executing the instructions, is further configured to cause the third-party service-providing server to:

send a request for obtaining credential to the open platform server, the request for obtaining credential carrying a unique identifier and a key corresponding to a target user account, and the target user account being a user account of the operator in the open platform server; and receive an interface-invocation credential sent by the open platform server, wherein the interface-invocation request further carries the interface-invocation credential.

11. The third-party service-providing server according to claim 8, the at least one processor, when executing the instructions, is further configured to cause the third-party service-providing server to:

detect that a number of bytes of a new added target link is greater than the preset threshold.

12. A link processing open platform server associated with a social network application and in communication with a third-party service-providing server, comprising:

a memory comprising instructions; and at least one processor in communication with the memory;

wherein the at least one processor, when executing the instructions, is configured to cause the link processing open platform server to:

recognize an official user account with the social network application for an operator of the third-party service-providing server, wherein the official user account is configured to be followed by common user accounts established with the social network application directly and distinct from the official user account, and wherein the third-party service-providing server is configured to provide services to common followers of the official user account via the link processing open platform server;

receive an interface-invocation request sent by the third-party service-providing server, the interface-invocation request carrying a target link in URL format, and a number of bytes of the target link being greater than a preset threshold;

invoke a preset interface to generate a unique identifier string corresponding to the target link and not in a valid URL format, a number of bytes of the unique identifier string being less than the preset threshold; and feed back the unique identifier string to the third-party service-providing server, so that the third-party service-providing server initiates a link casting service by sending a link casting message including the unique identifier string from the official user account to a common user account of a follower of the official user account for the follower to access the target link on a remote resource server via the open platform server;

receive a request for obtaining link sent by the client, the request for obtaining link carrying the unique identifier string;

obtain the target link corresponding to the unique identifier string; and send the target link to the client.

13. The link processing open platform server according to claim 12, wherein the at least one processor, when executing the instructions, is further configured to cause the link processing open platform server to:

receive a request for obtaining credential sent by the third-party service-providing server, the request for obtaining credential carrying a unique identifier and a key corresponding to the official user account;

detect whether the unique identifier and the key are correct;

generate an interface-invocation credential when the unique identifier and the key are correct; and feed back the interface-invocation credential to the third-party service-providing server.

14. The link processing open platform server according to claim 13, wherein the interface-invocation request further carries the interface-invocation credential, and the at least one processor, when executing the instructions, is further configured to cause the link processing open platform server to:

read the interface-invocation credential carried in the interface-invocation request; and verify that the interface-invocation credential is valid.

15. A network link processing system, comprising:

a third-party service-providing server and an open platform server associated with a social network application and in communication with the third-party service-providing server, wherein the third-party service-providing server comprises:

a first memory comprising first instructions; and at least one first processor in communication with the first memory;

wherein the at least one first processor, when executing the first instructions, is configured to cause the third-party service-providing server to:

obtain an official user account with the social network application for an operator of the third-party service-providing server, wherein the official user account is configured to be followed by common user accounts established with the social network application directly and distinct from the official user account, and wherein the third-party service-providing server is configured to provide initiate a link casting service to common followers of the official user account via the open platform server;

initiate an interface-invocation request carrying a target link in URL format, a number of bytes of the target link being greater than a preset threshold, the interface-invocation request being used for invoking a preset interface of the open platform server, the preset interface being used for generating a unique identifier string corresponding to the target link and not in a valid URL format, and a number of bytes of the unique identifier string being less than the preset threshold;

send the interface-invocation request to the open platform server;

receive the unique identifier string sent by the open platform server; and initiate the link casting service by sending a link casting message including the unique identifier string from the official account to a common user account of a follower of the official user account for the follower prompt the follower to initiate a process to obtain the target link from the open platform server followed by accessing the target link on a remote resource server, and wherein the open platform server comprises:

a second memory comprising second instructions; and at least one second processor in communication with the second memory;

wherein the at least one second processor, when executing the second instructions, is configured to cause the open platform server to:

recognize the official user account;

receive the interface-invocation request sent by the third-party service-providing server;

invoke the preset interface to generate the unique identifier string corresponding to the target link; and feed back the unique identifier string to the third-party service-providing server, so that the third-party service-providing server initiates the link casting service by sending a link casting message including the unique identifier string from the official user account to the common user account of the follower of the official user account for the follower to access the target link on a remote resource server.

16. The network link processing system of claim 15, the at least one first processor, when executing the first instructions to cause the third-party service-providing server to send the link casting message including the unique identifier string from the official user account to the common user account, is configured to cause the third-party service-providing server to:

send a graphic code generated by encoding the unique identifier string from the official user account to the common user account.

17. The network link processing system of claim 15, the at least one first processor, when executing the first instructions, is further configured to cause the third-party service-providing server to:

send a request for obtaining credential to the open platform server, the request for obtaining credential carrying a unique identifier and a key corresponding to the official user account; and receive an interface-invocation credential sent by the open platform server, wherein the interface-invocation request further carries the interface-invocation credential, and the at least one second processor, when executing the second instructions, is further configured to cause the open platform server further to:

receive the request for obtaining credential sent by the third-party service-providing server;

detect whether the unique identifier and the key are correct;

generate the interface-invocation credential when the unique identifier and the key are correct; and feed back the interface-invocation credential to the third-party service-providing server.

18. The network link processing system of claim 15, the at least one first processor, when executing the first instructions, is further configured to cause the third-party service-providing server to detect that a number of bytes of a new added target link is greater than the preset threshold.

* * * * *